United States Patent
Kimes et al.

(10) Patent No.: US 7,500,548 B2
(45) Date of Patent: Mar. 10, 2009

(54) DUAL-MODE ONE-WAY TORQUE TRANSMITTING DEVICE

(75) Inventors: John W. Kimes, Wayne, MI (US);
Gregory D. Gardner, Livonia, MI (US);
Norman J. Bird, Plymouth, MI (US);
Lee J. Becker, Canton, MI (US); Dennis N. Wys, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 315 days.

(21) Appl. No.: 11/408,384

(22) Filed: Apr. 21, 2006

(65) Prior Publication Data

US 2006/0185957 A1    Aug. 24, 2006

Related U.S. Application Data

(63) Continuation-in-part of application No. 10/899,918, filed on Jul. 28, 2004, now Pat. No. 7,100,756.

(51) Int. Cl.
*F16D 47/06* (2006.01)
*F16D 25/061* (2006.01)
*F16D 41/12* (2006.01)
*F16D 47/04* (2006.01)

(52) U.S. Cl. ............... 192/46; 192/48.92; 192/85 AT; 192/86

(58) Field of Classification Search ............ 192/48.92, 192/73, 85 AT
See application file for complete search history.

(56) References Cited

U.S. PATENT DOCUMENTS

| | | | |
|---|---|---|---|
| 709,900 A | 9/1902 | Gurney et al. | |
| 1,883,966 A | 10/1932 | Krause | |
| 2,013,765 A | 9/1935 | Richardson | |
| 2,134,405 A | 10/1938 | Hulshizer | |
| 2,323,353 A | 7/1943 | Plog | |
| 2,710,504 A | 6/1955 | Dodge | |
| 3,197,001 A | 7/1965 | Clements | |
| 3,527,327 A | 9/1970 | McCreary | |
| 3,563,354 A | 2/1971 | Sigg | |
| 3,997,041 A | 12/1976 | Judd | |
| 4,050,560 A * | 9/1977 | Torstenfelt | 192/85 AT |

(Continued)

FOREIGN PATENT DOCUMENTS

FR    548490    1/1923

(Continued)

*Primary Examiner*—Rodney H Bonck
(74) *Attorney, Agent, or Firm*—David B. Kelley; MacMillan, Sobanski & Todd, LLC

(57) ABSTRACT

A dual mode one-way torque transmitting device includes an inner race having a first plurality of notches spaced about an axis. An intermediate race includes a second plurality of notches spaced about the axis, a first plurality of pockets spaced about the axis, and a first plurality of rockers, each rocker being located in a pocket of the intermediate race. A spring urges each rocker toward engagement with a notch on the inner race. An outer race includes a second plurality of pockets spaced about the axis, a second plurality of rockers, each rocker being located in a pocket on the outer race, and a plurality of actuators, each actuator alternately engages and disengages a rocker on the outer race and a notch on the intermediate race.

13 Claims, 9 Drawing Sheets

U.S. PATENT DOCUMENTS

| | | | |
|---|---|---|---|
| 4,363,390 A | 12/1982 | Eisend et al. | |
| 5,064,037 A | 11/1991 | Long, Jr. | |
| 5,070,978 A | 12/1991 | Pires | |
| 5,143,189 A | 9/1992 | Meier-Burkamp | |
| 5,449,057 A * | 9/1995 | Frank | 192/46 |
| 5,638,929 A * | 6/1997 | Park | 192/85 AT |
| 5,853,073 A | 12/1998 | Costin | |
| 5,947,245 A | 9/1999 | Costin et al. | |
| 5,954,174 A | 9/1999 | Costin | |
| 5,971,122 A | 10/1999 | Costin et al. | |
| 6,062,362 A | 5/2000 | Costin et al. | |
| 6,109,410 A | 8/2000 | Costin | |
| 6,575,275 B2 | 6/2003 | Muramatsu et al. | |
| 6,679,364 B2 | 1/2004 | Muramatsu et al. | |
| 6,814,201 B2 * | 11/2004 | Thomas | 192/48.92 |
| 2002/0056602 A1 | 5/2002 | Aurora | |
| 2002/0112933 A1 | 8/2002 | Yamamoto et al. | |
| 2002/0148697 A1 | 10/2002 | Muramatsu et al. | |

FOREIGN PATENT DOCUMENTS

| | | |
|---|---|---|
| GB | 2116 | 1/1907 |

* cited by examiner

DUAL-MODE ONE-WAY TORQUE TRANSMITTING DEVICE

CROSS-REFERENCE TO RELATED APPLICATION

This application is a continuation-in-part of U.S. application Ser. No. 10/899,918, filed Jul. 28, 2004 now U.S. Pat. No. 7,100,756.

BACKGROUND OF THE INVENTION

The present invention relates to the field of overrunning, one-way clutches (OWC) and one-way brakes (OWB). More particularly the invention relates to a dual-mode, one-way torque transmitting device, at least one of whose operating modes is actuated by fluid pressure, either hydraulic or pneumatic.

Conventional one-way clutches or brakes for producing a one-way drive connection between inner and outer races of the clutch include sprags or rollers for releasably driveably connecting the races and the components of a mechanical assembly connected to the races. Such clutches are commonly used in the powertrain or driveline of an automotive vehicle. One-way clutches perform satisfactorily in many cases, but certain applications, such as those in which large magnitudes of torque are transmitted by the clutch, or those that provide only a small space for the clutch, require one-way clutches other than conventional sprag-type or roller-type clutch to meet desire requirements.

Conventional one-way clutch assemblies have at least one sprag or roller, which driveably locks two notched or pocketed races together mutually in one rotary direction and allows the races to rotate freely in the other direction. Rocker and sprag type one-way clutch assemblies can increase the torque capacity for a given package size compared to those of a roller-type clutch, but they are generally limited in torque transmitting capacity by the magnitude of the contact or bearing stresses caused by contact of the rockers or sprags with the races.

To overcome these and other difficulties, a one-way overrunning clutch described in U.S. Pat. No. 5,070,978 includes a drive member and a driven member, which are mounted for clockwise and counterclockwise rotation about a common axis. The drive member includes a planar drive face, normal to the common axis, which connects with a source of power for rotating the planar drive face either clockwise or counterclockwise. The driven member includes a planar driven face, positioned in close proximity to and in confronting relationship with the drive face. The drive and driven members are coupled to one another through a series of pockets in one of the drive faces, and a plurality of cooperating struts carried by the other face, such that when the drive member is driven counterclockwise, it drives the driven member with it. When the drive member is driven clockwise, it does not drive the driven member, but rotates freely relative to the driven member. Column stability of the strut, which transmits the torsion load between the races, is an importance factor in the design.

Conventional one-way clutches develop relatively large magnitudes of hoop stress in the races when torque is transmitted through the clutch; therefore, the races of conventional one-way clutches are formed of bearing grade steel in order to withstand the operating hoop stress.

Conventional one-way clutches are able to transmit torque in only one rotary direction. Consequently, in an automatic transmission application, a second OWC or brake is required to provide coast braking operation as well as reverse gear operation. The proposed device eliminates coast and reverse clutches in the transmission and replaces them with a hydraulically activated rocker clutch. This device is essentially two rocker clutches in a single device. One rocker clutch is conventionally/passively activated and released while the second clutch is hydraulically controlled via the transmission hydraulic control system and can be selectively activated and de-activated.

A need exits, therefore, for a low cost, selectable, dual mode, one-way torque transmitting device that produces low operating bearing stresses and can be formed readily from powered metal. The device should occupy little space, minimize in-service noise, and require little or no machining. Preferably, the desired device would include features that facilitate its assembly in a drive system.

SUMMARY OF THE INVENTION

A dual mode one-way torque transmitting device according to the present invention includes an inner race having a first plurality of notches spaced about an axis. An intermediate race includes a second plurality of notches spaced about the axis, a first plurality of pockets spaced about the axis, and a first plurality of rockers, each rocker being located in a pocket of the intermediate race. A spring urges each rocker toward engagement with a notch on the inner race. An outer race includes a second plurality of pockets spaced about the axis, a second plurality of rockers, each rocker being located in a pocket on the outer race, and a plurality of actuators, each actuator alternately engages and disengages a rocker on the outer race and a notch on the intermediate race. Preferably the first plurality of notches is located at a radial outer periphery of the inner race, the second plurality of notches is located at a radial outer periphery of the intermediate race, the first plurality of pockets is located at a radial inner periphery of the intermediate race, and the second plurality of pockets is located at a radial inner periphery of the outer race.

The device is hydraulically or pneumatically actuated and has two modes of operation. In one mode, the clutch operates to transmit torque in one rotary direction, e.g., as required for forward drive operation in an automatic transmission. In the other mode, pressure actuation permits the clutch to transmit torque in reverse drive and during coast conditions.

The device eliminates coast and reverse clutches in the transmission and replaces them with a hydraulically activated rocker clutch. The device is essentially two rocker clutches in a single assembly. One rocker clutch is passively activated and released; the second clutch is selectively controlled and activated by pressure. Preferably in automatic transmission applications, the activating pressure is produced the transmission's hydraulic control system.

Because a device according to this invention develops relative low operating hoop stresses in service, those clutches can be formed of powered metal. Clutches formed of powered metal potentially can be produced at relative low cost compared to the cost to form and produce a conventional clutch of high grade steel, provided extensive machining is avoided.

The races, which are of powered metal, require no secondary machining operations for any purpose, such as to eliminate densifiers and de-densifiers in the powered metal. The components of the clutch that are formed from powered metal require no machining after they are formed.

In addition to automatic transmission applications, a device according to this invention can be applied in industrial gear box units that require clutch devices for selecting input and output members, and in gear selection devices for manual transmissions.

DESCRIPTION OF THE DRAWINGS

These and other advantages of the present invention will become readily apparent to those skilled in the art from the following detailed description of a preferred embodiment when considered in the light of the accompanying drawings in which.

DESCRIPTION OF THE PREFERRED EMBODIMENT

Figure 1:
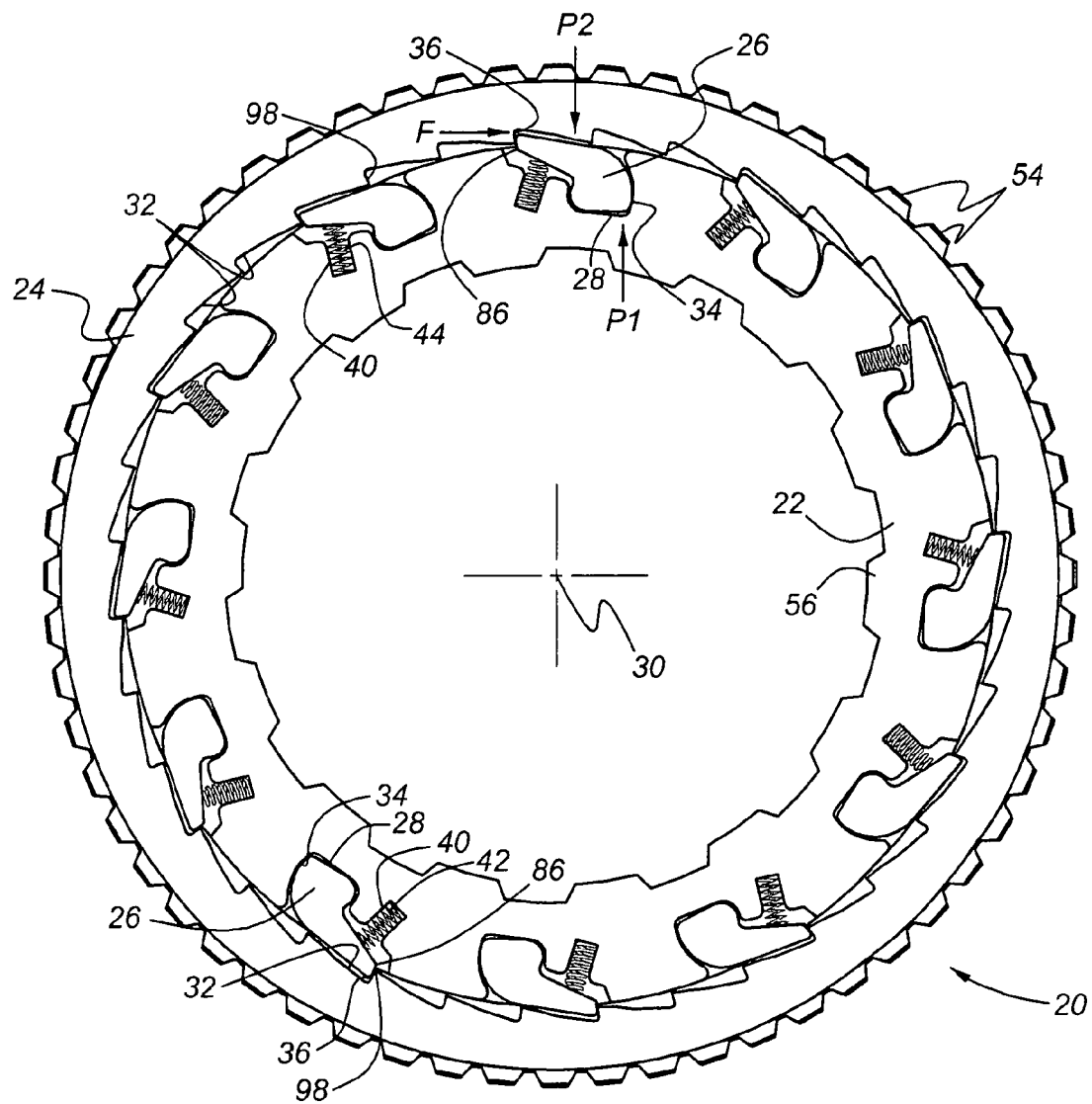
FIG. 1 is a side view of a clutch according to the present invention showing rockers located in an inner race and engaged with notches in an outer race.
Figure 2:
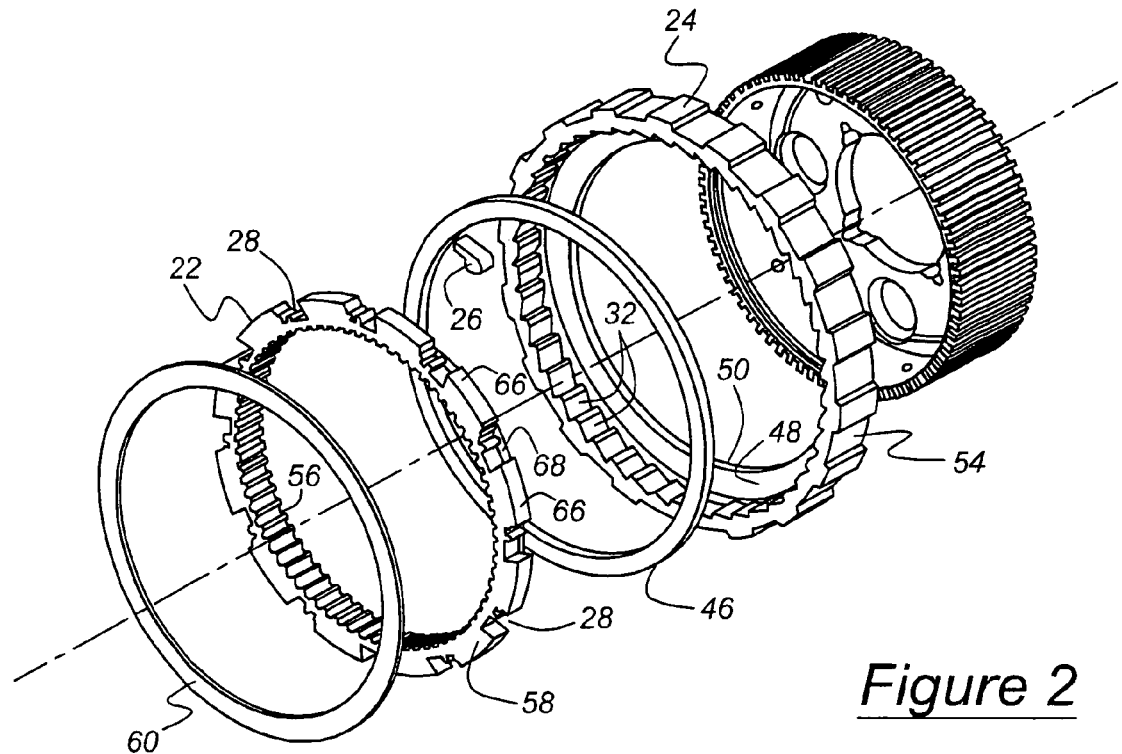
FIG. 2 is an isometric view of the clutch assembly showing the components mutually spaced axially.

Referring now to the drawings, there is illustrated in FIG. 1 a one-way clutch assembly 20 in accordance with the present invention. The clutch assembly 20 includes an inner race or rocker plate 22, an outer race or cam plate 24, and a plurality of rockers 26, each rocker being located in a pocket 28 formed in the inner race 22 and angularly spaced mutually about a central axis 30. The inner periphery of the outer race 24 is formed with a plurality of cams or notches 32 angularly spaced mutually about axis 30. There are twelve rockers 26 and pockets 28 and thirty-six notches 32 in the clutch illustrated in FIG. 1.

When the inner race 22 rotates clockwise faster than the outer race 24, each rocker 26 pivots counterclockwise in its pocket 28 away from engagement with the notches 32 due to contact of the rockers with the inner radial surface of the outer race. This allows the inner race 22 to rotate freely clockwise about axis 30 relative to the outer race 24. When the inner race 22 attempts to rotate counterclockwise relative to the outer race 24, the inner race and outer race are engaged or driveably connected mutually by engagement of the rockers 26 with the notches 32.

When the clutch 20 is engaged, each engaged rocker 26 transmits a force F between the inner and outer races 22, 24 due to its contact with the inner surface 34 of the pocket and with the radially directed surface 36 of the engaged notch 32.

A recess 40, located at each pocket 28, contains a spring, such as a helical coiled compression spring 42 or an accordion compression spring 44, for urging each rocker to pivot in its pocket toward engagement with the notches.

FIGS. 2-5 show a clutch having a rocker plate 22 formed with angularly spaced pockets 28 and spring recesses 40, each pocket containing a rocker 26 that pivots in a respective pocket alternately to engage and to disengage the notches 32 formed on the radially inner surface of the cam plate 24. A bushing 46 of powered metal fits within the cam plate 24.

Figure 5:
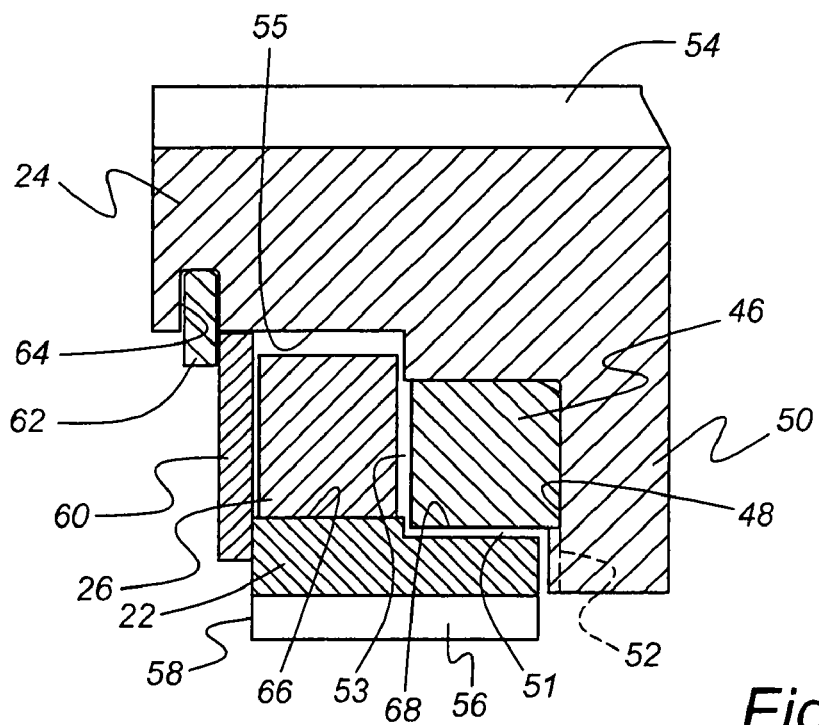
FIG. 5 is a side view, partial cross section through a diametrical plane showing the components assembled.

As seen best in FIG. 5, when clutch 20 is assembled, an axial surface of bushing 46 contacts an inner axial surface 48 of a flange 50. Surface 48 is formed with radially directed grooves 52, which carry fluid lubricant, preferably transmission oil, radially outward a radial inner surface of the bushing 46. Oil enters the radial grooves 52 through holes 49 formed through a drive system component 72, which is connected to the clutch 20. The oil travels axially leftward across the inner radial surface 51 on the bushing 46, to a radial space 53, which directs the oil radially outward to surface 55, across the width of the rocker plate 22 and across the surface of the rockers 26. Bushing 46 pilots the inner and outer races 22, 24 and eliminates need to machine along the notches or cams 32 of the outer race or the radial outer surface area 66 of the rocker plate 22. Lubricating oil is precisely directed radially along grooves 52 to the bushing 46, then axially between surfaces 68 on the rocker plate 22 and the inside diameter 51 of the bushing to the rockers 26. The lubricant flows along this path due to a centrifugal pressure head developed as the clutch rotates about axis 30.

The radial outer surface of the cam plate 24 is formed with splines 54, by which the cam plate is driveably connected to a drive system. Similarly, the radially inner surface of the rocker plate 24 is formed with splines 56, by which the rocker plate is driveably connect to a component of the drive system.

An axial surface 58 of rocker plate 22 contacts a retainer ring 60, which closes the axial end of each pocket 28 and is retained in position by a snap ring 62, which engages a recess 64 formed on the cam plate 24.

Figure 3:
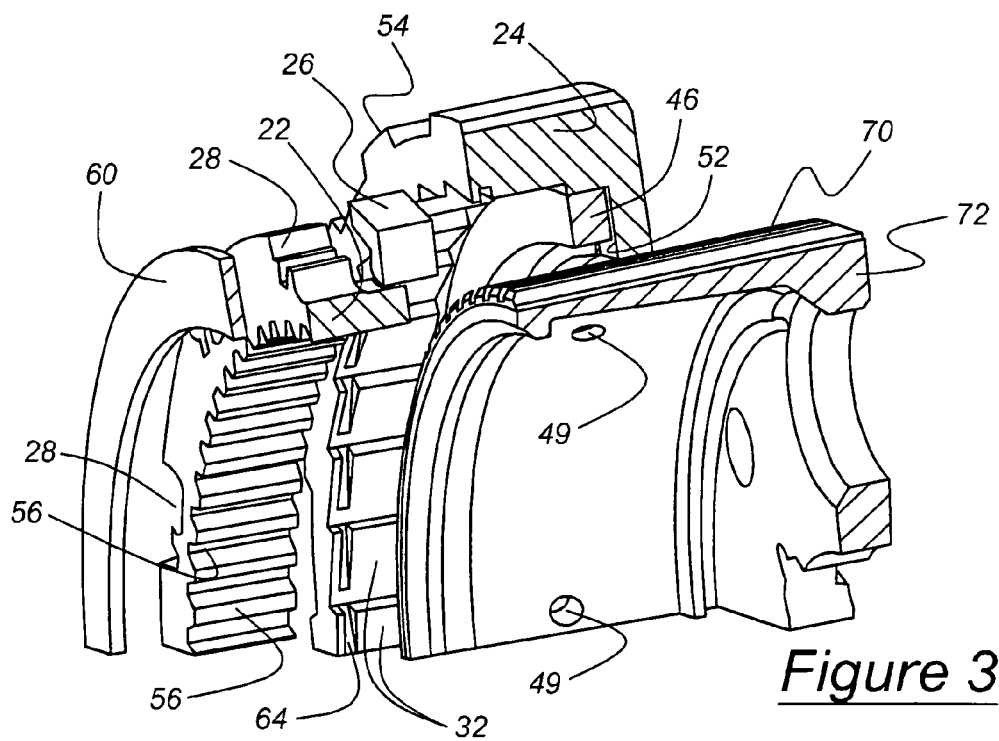
FIG. 3 is an isometric view of the clutch assembly of FIG. 2 partially in cross section taken at a diametric plane showing the components in spaced relationship.
Figure 4:
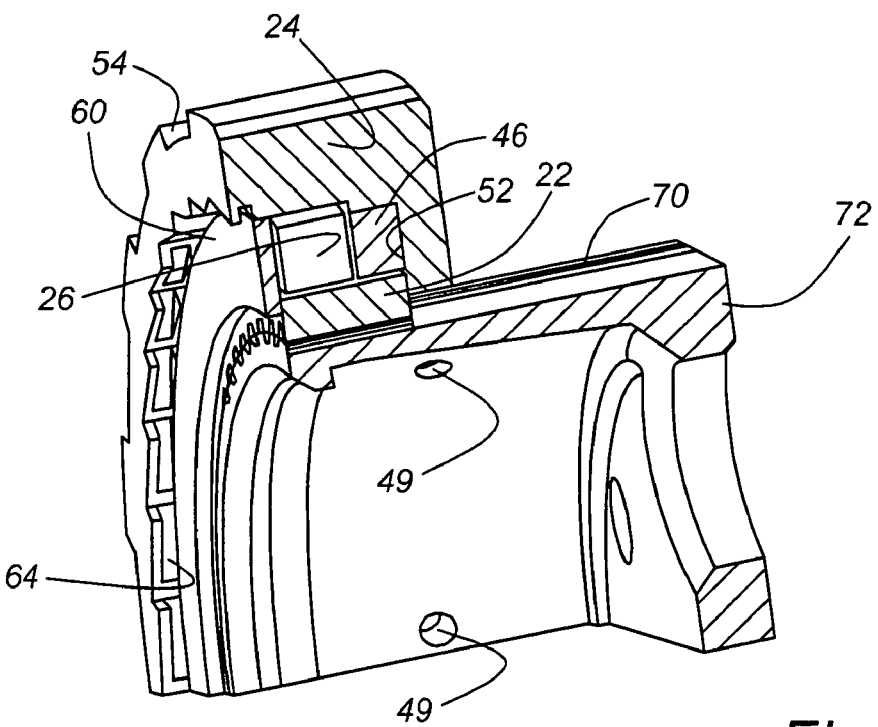
FIG. 4 is an isometric view of the clutch assembly of FIG. 2 partially in cross section through a diametrical plane showing the components assembled.

FIGS. 3 and 4 show the components of the clutch 20 located immediately adjacent their assembled positions and in the assembled positions, respectively. The clutch 20 is assembled with the cam plate 24 driveably connected by splines 70 to a drum 72 of a vehicle drive system.

Figure 6:
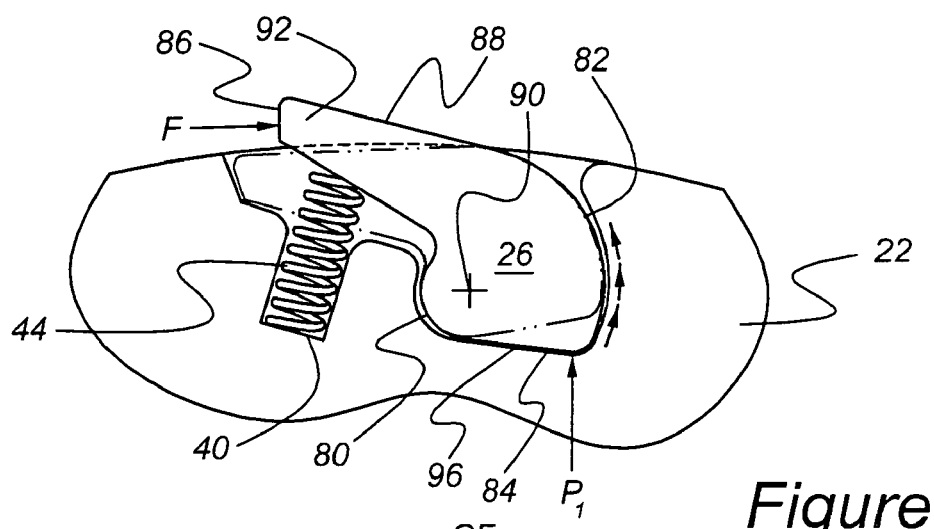
FIG. 6 is side view of a portion of an inner race showing a rocker, pocket, and return spring.

Referring now to FIG. 6, a preferred embodiment of a rocker 26 may include several surfaces 80, 82, 84, 86, 88, and a defined pivot center 90. Surfaces 80 and 82 are both circular cylindrical surfaces whose arcs are concentric with the pivot center 90. Surfaces 80, 82 guide rotation or pivoting of the rocker 26 and limit that pivoting to one degree of freedom. The arcs of both surfaces 80, 82 must be sufficient such that the neck or strut portion 92 of the rocker is narrower than the counterweight portion 94 in order to restrain the rocker in the radial direction from center 90.

Surface 80 is a guiding surface. When force F is applied while the clutch is driving and the rockers 26 are engaged with the notches 32, preferably no reaction force is developed on surface 80. Surface 82 is a surface on which the reaction to force F is developed when clutch 20 is transmitting torque between the outer race and inner race 22 through the rocker 26. Because the center of surface 82 is located at the pivot center 90, the reaction to force F is distributed along surface 82 is centered at pivot center 90, and produces no torque tending to pivot the rocker 26 about the pivot center.

Surface 84 limits clockwise pivoting of the rocker 26 and assists assembly of the race 22 or 24 that contains the pockets 28, rockers 26 and springs 42, 44. That race is prepared for installation by inserting a rocker 26 in each pocket and placing a spring 42, 44 in each recess 40. The force applied by the spring on its respective rocker rotates the rocker to the position shown in FIG. 6 where surface 84 contacts the base 96 of the pocket 28. The spring force and its reaction force on the base 96 retain the rocker in the pocket without the presence of the other race or another assembly aid. The race containing the rockers can be transported readily with the rockers in this retained condition preparatory to installing the race subassembly in the clutch assembly 20.

By limiting pivotal rotation of the rocker 26 about pivot center 90, a counter-rotation reaction force on the strut is generated at surface 84 when the clutch is driving or engaged. When clutch 20 is driving, force F, applied to rocker surface 86, produces a clockwise torque on the rocker about the pivot center 90. Torque about center 90 produced by force F is reacted by a force P1 where rocker surface 84 contacts pocket surface 96. Without surface 84, the full reaction torque would be reacted elsewhere. For example, if the full torsion reaction to force F were applied to rocker surface 88, a large hoop stress would be generated on the race contacted by surface 88 tending to shear the wall of that race due to a high angle of incidence of the reaction force. If the torsion reaction to force F were applied to surface 82, it would be applied at the extremity of the inner race at its weakest point. Preferably, the torsion reaction to force F is located normal to the pocket base 96 at rocker surface 84, and on surface 82 where friction is developed due to contact with the pocket.

Surface 86 is the surface on which force F is applied when the clutch 20 is driving and the rockers 26 are engaged with the radial surfaces 36 of the notches 32. Surface 86 performs this function by creating a mechanical interference when the rocker is pivoted to the engaged position.

Surface 88, located at the contour of the strut portion 92 of the rocker 26, contacts the crest 98 of the radial surfaces 36 of the notches 32 to ensure no interference when the clutch 20 is overrunning and the rockers 26 are disengaged from the notches 32. Surface 88 is curved to facilitate formation of a film of lubricant while the clutch is overrunning. Surface 88 is curved also to minimize impact with the crests 98 while the clutch overruns by providing transitional positions that minimize the rate of rotation of the rocker into the pocket relative to the rate of rotation of the outer race. This minimizes angular acceleration on the rocker as the clutch overruns.

The center of mass 100 of the rocker 26 can be located in relation to the pivot center 90 such that centrifugal force tends either to engage or to disengage the rocker, whether the rocker is located on the outer race or the inner race.

Figure 7:
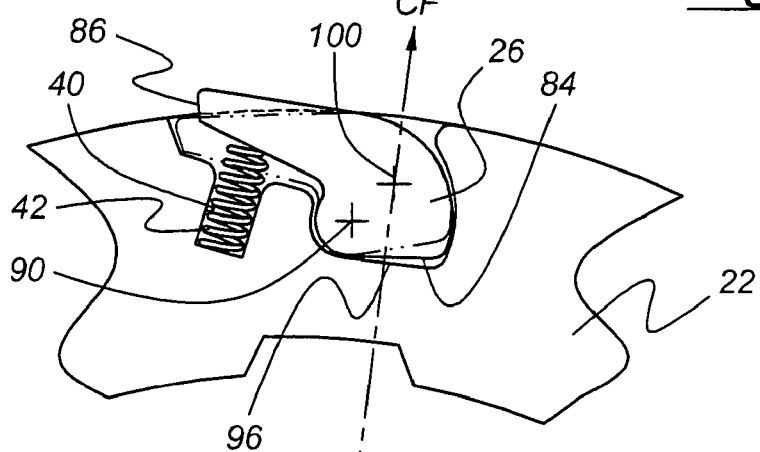
FIG. 7 is side view of a portion of an inner race showing a rocker, pocket, return spring, and a CF vector.
Figure 7:
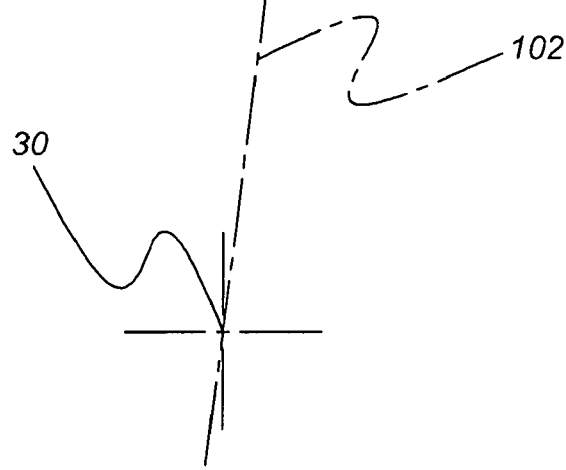

When viewed as in FIG. 7, the center of mass 100 is located rightward from a line connecting the axis 30 and the pivot center 90, and the rocker is carried in a pocket located on an inner race 22. As the clutch assembly 20 rotates about axis 30, centrifugal force on the rocker is directed radially outward along a line 102 that passes through axis 30 and the center of mass 100, causing the rocker 26 to pivot counterclockwise about the pivot center 90. This counterclockwise pivoting of the rocker opposes the force of the spring 42, 44 and tends to pivot rocker surface 86 away from contact with pocket surface 36 on the inner race 24. This counterclockwise pivoting of the rocker tends to move the rocker to a disengaged position, and allows the inner race 22 to overrun and the clutch 20 to disengage. The magnitude of the moment about pivot center 100 tending to compress spring 42 and to pivot the rocker 26 to the disengaged position varies with the speed of rotation of the inner race and the distance of the center of mass 100 from the pivot center 90.

Alternatively the center of mass may be located leftward from a line connecting the axis 30 and the pivot center 90, when the rocker is carried in a pocket located on an inner race 22. In that case, as the clutch assembly 20 rotates about axis 30, centrifugal force on the rocker causes the rocker 26 to pivot clockwise about the pivot center 90. This clockwise pivoting of the rocker adds to the effect of the force of spring 42, tends to move surface 86 of the rocker toward contact with radial surface 36 on the outer race 24, i.e., to pivot the rocker 26 to an engaged position, and causes the clutch to engage.

Figure 8:
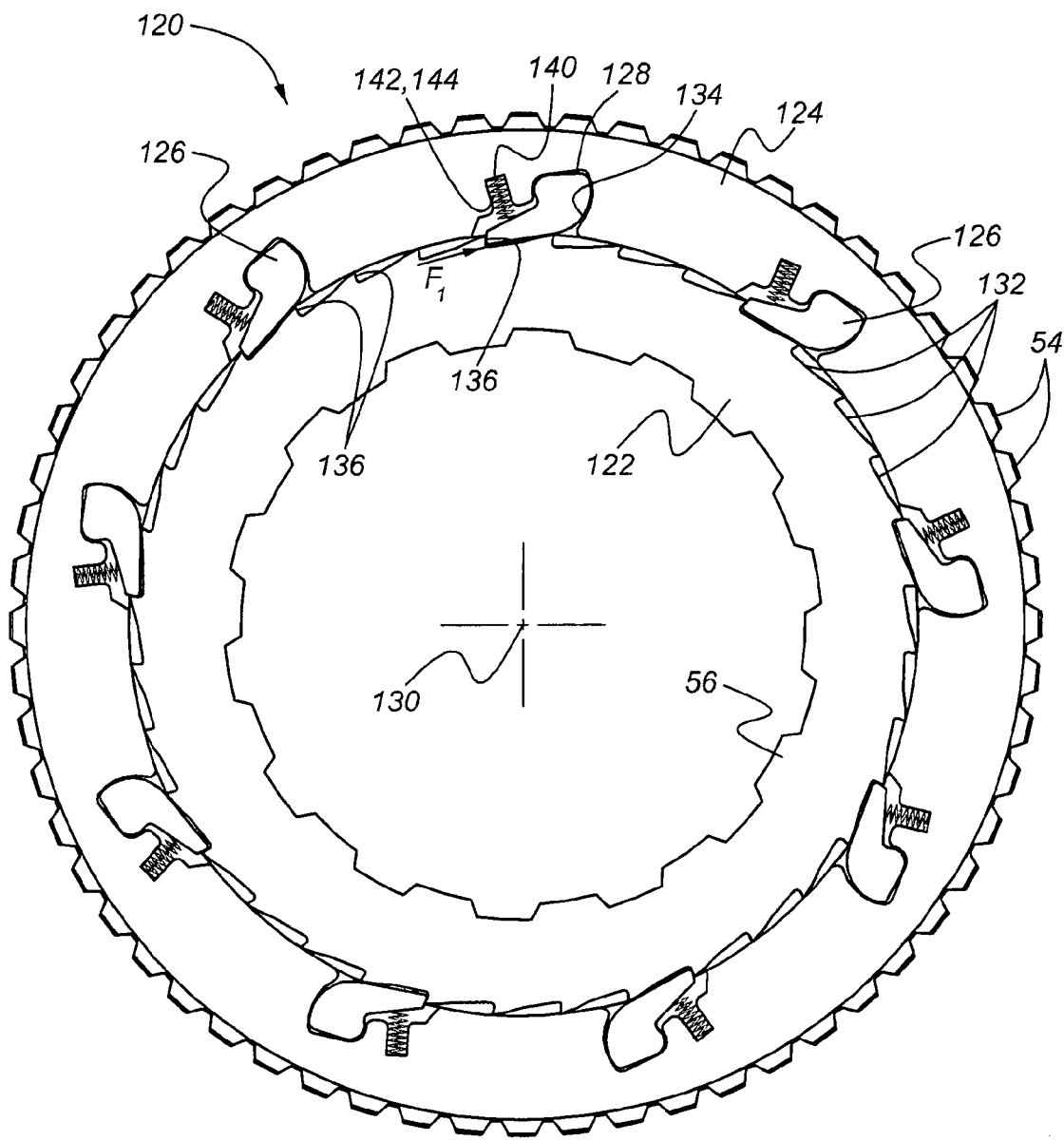
FIG. 8 is a side view of a clutch showing rockers located in an outer race and engaged with notches in an inner race.
Figure 9:
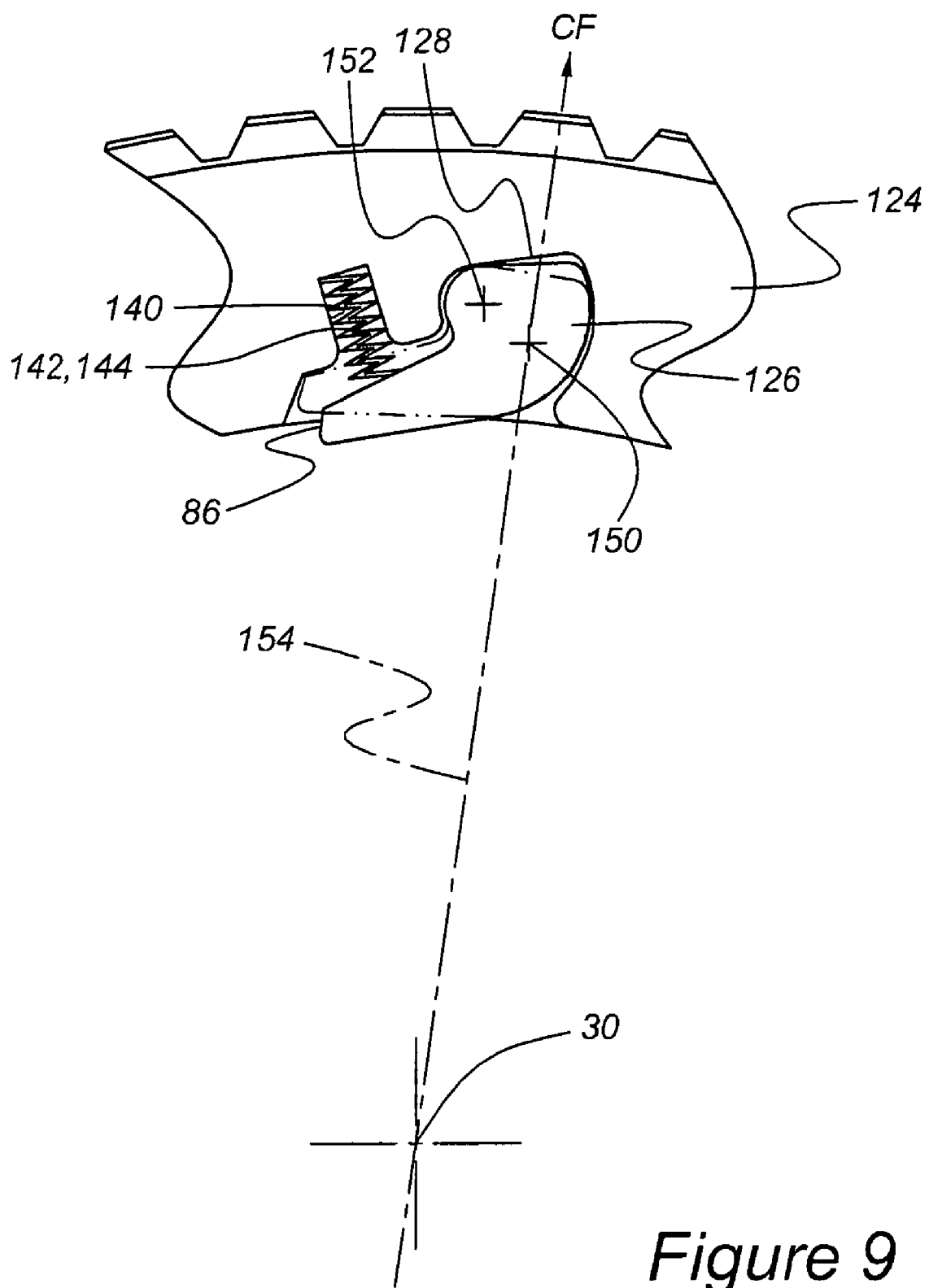
FIG. 9 is side view of a portion of an outer race showing a rocker, pocket, return spring, and a CF vector.
Figure 10:
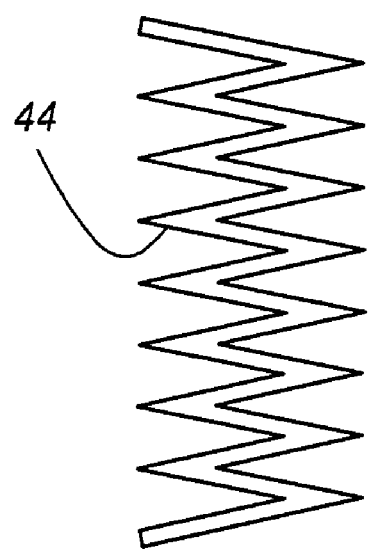
FIG. 10 is side view of an accordion return spring.
Figure 11:
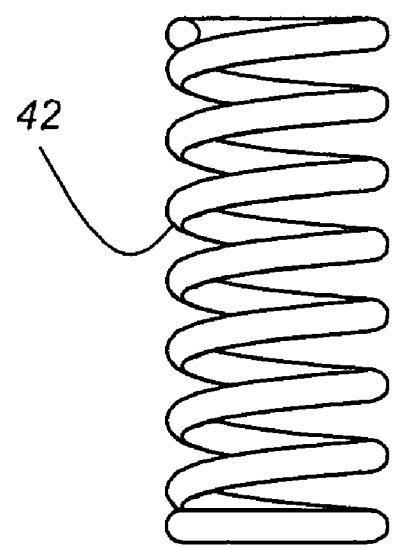
FIG. 11 is side view of a helical return spring.

The configuration of the clutch assembly described with reference to FIGS. 8 and 9, in which an inner race or cam plate 122 formed with notches is surrounded by an outer race or rocker plate 124 formed with pockets, each pocket containing a rocker, can be applied also to a dual mode, one-way clutch.

Figure 12:
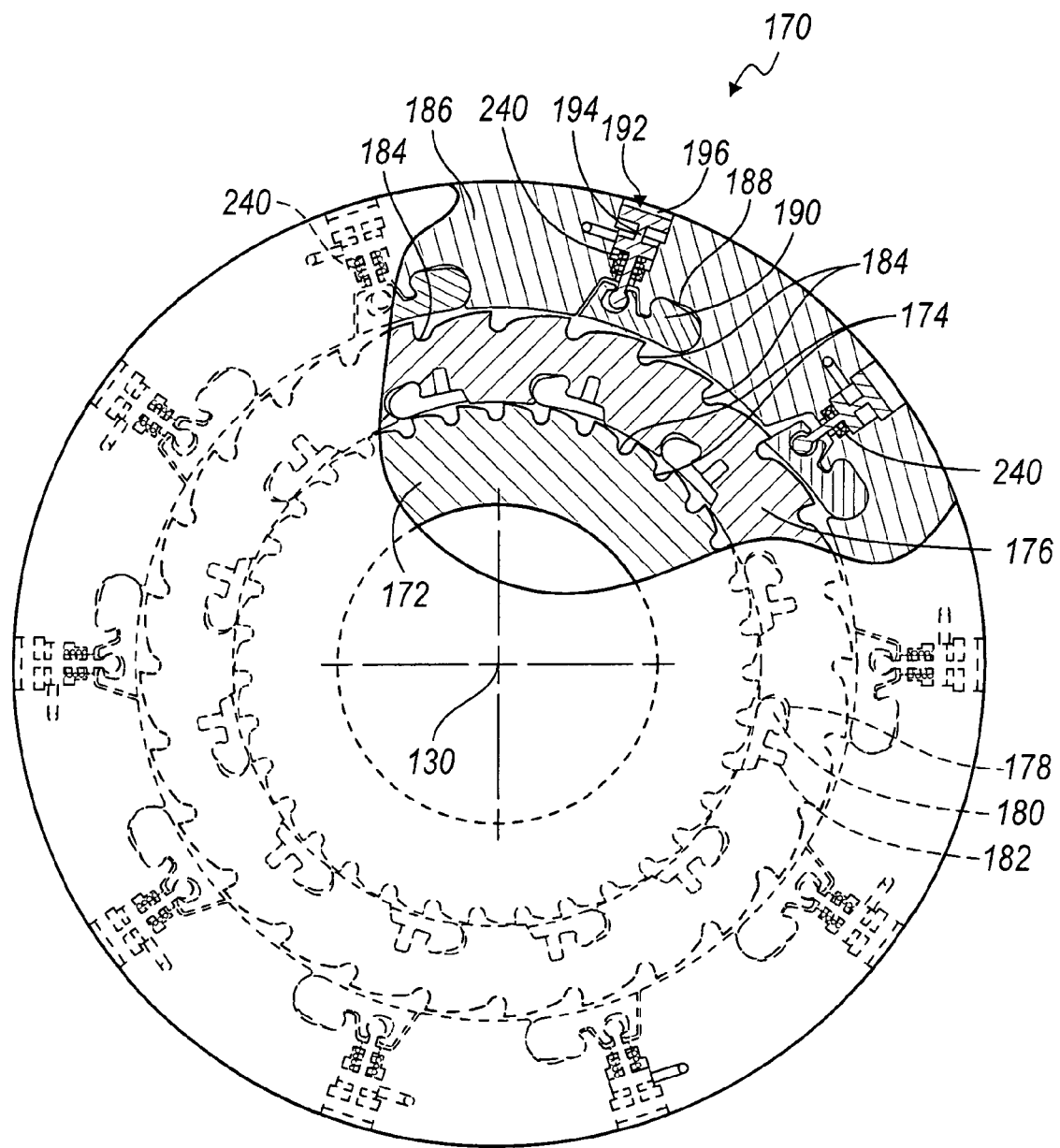
FIG. 12 is a side view of a torque transmitting device showing rockers located in an outer race and engaged with notches in an inner race.

As shown in FIG. 12, a dual mode clutch 170 includes an inner race or cam plate 172 formed with notches 174 spaced mutually about the axis 130. An intermediate race or rocker plate 176 is formed with pockets 178 spaced mutually about the axis 130, each pocket containing a rocker 180 that is biased by a spring located in a spring recess 182 toward engagement with a notch 174 on the inner race 176. There are twelve rockers 180 and pockets 178 on the intermediate race 176 and thirty-four notches 174 on the inner race 172 of the clutch illustrated in FIG. 1. The radial outer surface of intermediate race 176 is formed with twenty-eight notches 184 mutually spaced angularly about axis 130.

When the intermediate race 176 rotates counter clockwise faster than the inner race 172, each rocker 180 pivots clockwise in its pocket 178 away from engagement with the notches 174 due to contact of the rockers with the outer radial surface of the inner race. This allows the intermediate race 176 to rotate counter clockwise about axis 130 relative to the inner race 172. When the intermediate race 176 attempts to rotate clockwise relative to the inner race 172, the inner race and intermediate race are engaged or driveably connected mutually due to engagement of the rockers 180 with the notches 174.

When the inner and intermediate races 172, 176 of clutch 170 are so engaged, one or more engaged rockers 180 transmit a force between the inner race and intermediate race due to the rocker's engagement with a notch 174 of the inner race 172 and engagement with the pocket 178 containing the engaged rocker.

The spring recesses 182, located at each pocket 178, contains a spring, such as a helical coiled compression spring 142 or an accordion compression spring 144, for urging each rocker to pivot in its pocket toward engagement with the notches 174.

The clutch assembly 170 includes an outer race 186 surrounding the intermediate race 176 and formed with pockets 188 spaced mutually about axis 130, each pocket 188 containing a rocker 190. Each rocker 190 is secured to a control valve 192, which includes a spool 194 located in a chamber. Each spool 194 moves in its chamber 196 in response to actuating force applied to the chamber. When the spool 194 moves toward axis 130, the respective rocker 190 pivots in its pocket 188 causing the rocker to engage one of the notches 184 on the intermediate race 176, thereby driveably connecting the outer race 186 and the intermediate race 176. When the spool moves away from axis 130, the respective rocker 190 pivots in its pocket 188 causing the rocker to disengage the notches 184 on the intermediate race 176, thereby allowing the intermediate race 176 and outer race 186 to rotate mutually independently.

Figure 13:
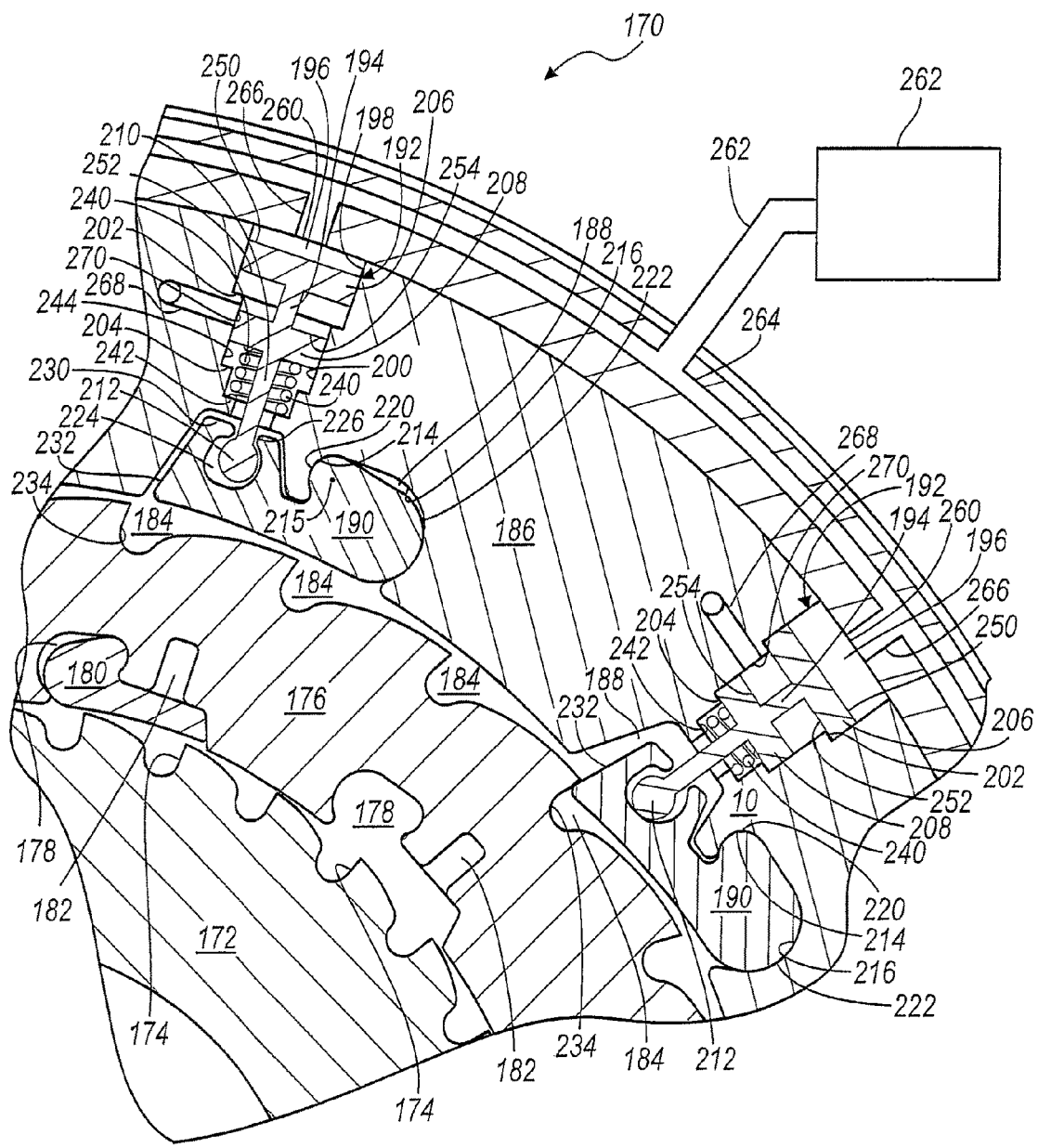
FIG. 13 is a partial side view of the torque transmitting device of FIG. 12 showing the actuators in greater detail.

FIG. 13 illustrates the rockers 190 of the outer race 186 both disengaged from the 184 notches of the intermediate race 176 and engaged with the notches. Each actuator for controlling engagement and disengagement of clutch 170 includes a chamber 196 that contains the spool 194 of control valve 192. Chamber 196 is formed with a large diameter circular cylindrical bore 198, which extends to a radial end of the chamber, and a smaller diameter circular cylindrical bore 200. Chamber 196 includes a shoulder 202 located at the inner axial end of bore 198, and a shoulder 204 located at the inner axial end of bore 200. Valve 194 includes a large diameter land 206 fitted in bore 198, a smaller land 208 fitted in bore 200 and connected to land 206, a stem 210 extending axially from land 208 along the chamber 196 toward axis 130, and a cylindrical or spherical surface 212 formed on the axial end of the stem. Each chamber 196 may be aligned with a radius from axis 130, offset from such radius, or skewed with respect to such radius.

The rocker pocket 188 is formed with a first inner circular cylindrical surface 214, which has a pivot center 215, and a second inner circular cylindrical surface 216, which surfaces 214, 216 preferably extend substantially parallel to axis 130. Each rocker 190 is formed with an outer circular cylindrical surface 220 having a center substantially aligned with an axis through the pivot center 215, and pivots in contact with surface 214 into engagement with a notch 184. Each rocker is formed with outer circular cylindrical surface 222, which contacts surface 216 when the rocker engages a notch 184. The surface 212 on the end of the valve spool 194 is fitted into a recess 224 formed on the rocker 190, the recess having a constricted opening 226 extending along the thickness of the rocker, which prevents the valve 194 from disengaging the rocker through the opening 226. The valve 194 is installed in and removed from the recess 224 through an opening at an axial end of the rocker 190.

When the rocker 190 is disengaged from the inner race 176, the rocker is seated in contact with a stop surface 230 formed on the outer race 186. When the rocker pivots into engagement with a notch 184, surface 232 on the rocker contacts surface 234 on the notch 184, and the rocker surface 222 contacts outer race surface 216.

Each valve spool 192 may be biased axially in its chamber 196, i.e., radially outward away from axis 130, to the disengaged position shown in FIG. 13 by a compression spring 240, which contacts a third shoulder 242, located at the radial inner end of a bore 244 in the chamber wall, and the radial inner face of land 208. The first land 206 is formed with a first pressure area 250 facing radially outward, and a second pressure area 252 facing radially inward. The second land 208 is spaced along the axis of chamber 196 from land 206 and includes a third pressure area 254 facing the second pressure area 252, and having a smaller area than that of the second pressure area 252.

The axial end of each chamber 196 has a port 260, through which a source of actuating pressure 262 is communicated by passages 262, 264, 266 to the first pressure area 250 on land 206. A force produced on area 250 by that pressure opposes the force of spring 244 and tends to move spool 194 in chamber 196 and to move rocker 190 toward engagement with a notch 184. When actuating pressure is reduced or vented from pressure area 250, the spring force retracts rocker 190 to the disengaged position at the left side of FIG. 13.

A passage 268, preferably formed in race 186, communicates chamber 196 to a port 270, through which the source of actuating pressure 262 is communicated to the second pressure area 252 on land 206 and to the third pressure area 256 on land 208. The valve and rocker are shown in the engaged position at the right side of FIG. 13. Due to the difference in size of the areas 252, 254, the net force produced on the valve 194 by the actuating pressure is in the same direction as the force of spring 244 and tends to move spool 194 in chamber 196 and to move rocker 190 away from engagement with a notch 184. When actuating pressure is reduced, vented or absent from pressure area 250, the spring force alone retracts rocker 190 to the disengaged position at the left side of FIG. 13.

In operation, the actuators operate properly when an actuating pressure is applied to the first pressure area 250 to engage the clutch 170 and the spring force disengages the clutch after the actuating pressure is reduced or vented. However, to further ensure that the clutch will disengage upon reducing or venting the actuating pressure from the first pressure area 250, an actuating pressure may be applied through passage 268 and port 270 to the second and third pressure areas 252, 254. The force on the valve due to pressurizing the second and third pressure areas 252, 254, adds to the spring force and helps disengage the clutch.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A dual mode one-way torque transmitting device comprising:
   an inner race including a first plurality of notches mutually spaced about an axis;
   an intermediate race including a second plurality of notches mutually spaced about the axis, and a first plurality of pockets mutually spaced about the axis;
   a first plurality of rockers, each rocker of the first plurality of rockers being located in a pocket of the intermediate race;
   a spring for urging a rocker of the first plurality of rockers toward engagement with a notch on the inner race;
   an outer race including a second plurality of pockets spaced mutually about the axis;
   a second plurality of rockers, each rocker of the second plurality of rockers being located in a pocket on the outer race; and
   a hydraulic actuator alternately operating to engage and to disengage a rocker on the outer race and a notch on the intermediate race and including a second spring that produces a force tending to disengage a rocker on the outer race and a notch on the intermediate race.

2. The dual mode one-way torque transmitting device of claim 1 wherein:
   the first plurality of notches is located at a radial outer periphery of the inner race;
   the second plurality of notches is located at a radial outer periphery of the intermediate race;
   the first plurality of pockets is located at a radial inner periphery of the intermediate race; and
   the second plurality of pockets is located at a radial inner periphery of the outer race.

3. The dual mode one-way torque transmitting device of claim 1, wherein:
   each pocket of the intermediate race defines a first pivot center; and
   each rocker of the first plurality of rockers includes a center of mass positioned relative to the first pivot center such that, upon rotation of the intermediate race, said rockers are biased by centrifugal force toward engagement with a notch on the inner race.

4. The dual mode one-way torque transmitting device of claim 1, wherein:
   each pocket of the intermediate race defines a first pivot center; and each rocker of the first plurality of rockers includes a center of mass positioned relative to said first pivot center such that, upon rotation of the intermediate race, said rockers are biased by centrifugal force away from engagement with a notch on the inner race.

5. The dual mode one-way torque transmitting device of claim 3 wherein:
each pocket of the outer race defines a second pivot center; and
each rocker of the second plurality of rockers pivots about the second pivot center into engagement with a notch on the intermediate race.

6. The dual mode one-way torque transmitting device of claim 1 wherein each actuator includes:
a chamber;
a spool located in the chamber and secured to a rocker on the outer race;
a spring located in the chamber for biasing the spool to move the rocker away from engagement with a notch on the intermediate race; and
a port through which actuating pressure is communicated to the chamber and spool for actuating the spool to move the rocker toward engagement with a notch on the intermediate race.

7. The dual mode one-way torque transmitting device of claim 1 wherein each actuator includes:
a chamber;
a spool located in the chamber, secured to a rocker on the outer race, and including a first land including a first pressure area;
a spring located in the chamber for biasing the spool to move the rocker away from engagement with a notch on the intermediate race; and
a port through which actuating pressure is communicated to the first pressure area, thereby producing a force on the first pressure area tending to move the rocker toward engagement with a notch on the intermediate race.

8. The dual mode one-way torque transmitting device of claim 1 wherein each actuator includes:
a chamber;
a spool located in the chamber and secured to a rocker on the outer race;
a spring located in the chamber for biasing the spool to move the rocker away from engagement with a notch on the intermediate race;
a first port through which actuating pressure is communicated to the chamber for actuating the spool to move the rocker toward engagement with a notch on the intermediate race; and
a second port through which actuating pressure is communicated to the chamber for actuating the spool to move the rocker away from engagement with a notch on the intermediate race.

9. The dual mode one-way torque transmitting device of claim 1 wherein each actuator includes:
a chamber;
a spool located in the chamber, secured to a rocker on the outer race, comprising a first land including a first pressure area and a second pressure area, and a second land including a third pressure area that is smaller than the second pressure area;
a spring located in the chamber for biasing the spool to move the rocker away from engagement with a notch on the intermediate race;
a first port through which actuating pressure is communicated to the first pressure area, thereby producing a force on the spool tending to move the rocker toward engagement with a notch on the intermediate race; and
a second port through which actuating pressure is communicated to the second pressure area and the third pressure area, thereby producing on the second pressure area and the third pressure area a net force tending to move the rocker away from engagement with a notch on the intermediate race.

10. A dual mode one-way torque transmitting device comprising:
a first race including notches spaced about an axis;
a second race including pockets spaced about the axis;
rockers, each rocker located in a pocket;
hydraulic actuators, each actuator including a spool in a chamber and secured to a rocker; a spring biasing the spool to move the rocker away from a notch; a first port carrying pressure that urges the spool to move the rocker toward engagement with the notch; and a second port carrying pressure that urges the spool to move the rocker away from the notch.

11. The dual mode one-way torque transmitting device of claim 10 wherein:
the notches are located at a radial outer periphery of the first race; and
the pockets are located at a radial first periphery of the second race.

12. A dual mode one-way torque transmitting device comprising:
a first race including notches spaced about an axis;
a second race including pockets spaced about the axis;
rockers, each rocker located in a pocket;
actuators, each actuator including a spool located in a chamber, secured to a rocker, comprising a first land including first and second pressure areas, and a second land including a third pressure area smaller than the second pressure area; a spring biasing the spool to move the rocker away from a notch; a first port carrying pressure to the first pressure area on which a force urges the rocker toward engagement with a notch; and a second port carrying pressure to the second and third pressure areas on which a net force tends to move the rocker away from a notch.

13. The dual mode one-way torque transmitting device of claim 12 wherein:
the notches are located at a radial outer periphery of the first race; and
the pockets are located at a radial first periphery of the second race.

* * * * *